CONTROL AND DELAY DEVICE FOR LIQUID FLUID CIRCUITS

Filed Nov. 27, 1964

INVENTOR
ARNOLD SCHONFELD
JOHN C. SCHULTE

BY Thomas P. Murphy

AGENT

United States Patent Office 3,331,380

Patented July 18, 1967

3,331,380

CONTROL AND DELAY DEVICE FOR LIQUID FLUID CIRCUITS

Arnold Schonfeld, Levittown, and John C. Schulte, Maple Glen, Pa., assignors to Sperry Rand Corporation, New York, N.Y., a corporation of Delaware Filed Nov. 27, 1964, Ser. No. 414,186
5 Claims. (Cl. 137—81.5)

Figure 1:
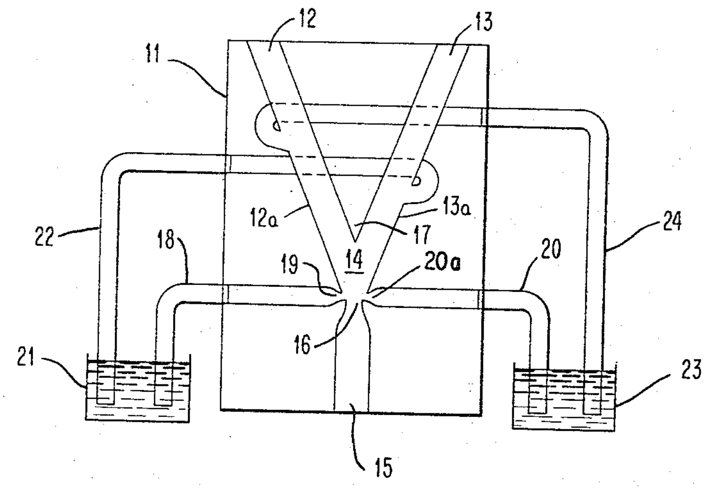

This invention relates to a fluid control circuit and more particularly to a liquid fluid control circuit for use as a self restoring delay multiple switching device.

Basically, this invention employs the fluid amplification concept, that is, control of a large amount of fluid with a relatively small amount of control fluid. More precisely, fluid amplification involves the switching or changing of direction of a high energy fluid power stream by means of a low energy fluid control stream. The Patent 3,024,805, to B. M. Horton for "Negative Feedback Fluid Amplifier," issued Mar. 13, 1962, gives a good explanation of fluid amplification and fluid amplifiers.

The present invention contemplates a fluid amplifier having two output channels wherein a power stream of liquid is switched between the output channels. The fluid amplifier of the present invention incorporates novel self restoring fluid delay means whereby the liquid stream is maintained in each output channel for a predetermined period of time before it is switched to the other output channel. This capability to switch a power stream from one output channel to another and maintain the power stream in each output channel for a desired time period makes the present invention ideally suited for use in many applications requiring delays, stepping or other regulated flow of a liquid.

The present invention further contemplates a fluid control circuit employing a plurality of the above-discussed fluid amplifier wherein the delay means causes each fluid amplifier to be switched in turn in a stepping fashion. Upon switching of the last fluid amplifier the process repeats until power is removed.

The present invention could be used as a fluid stepping relay or other flow regulating device. Since the present invention employs no moving parts, frictional wear is substantially eliminated which increases reliability and prolongs its functional life. Furthermore, due to the lack of moving parts the present invention is relatively inexpensive to manufacture and requires virtually no maintenance. The present invention lends itself to simple molding manufacturing processes resulting in low cost of production. Since the device may be manufactured from plastic it is virtually unaffected by corrosion or atmospheric conditions. Since the present invention employs no moving parts, no power is lost in driving mechanisms or in overcoming the inertia of moving parts.

Therefore, it is an object of the present invention to provide a fluid control circuit employing no moving parts.

Another object of the present invention is to provide a liquid fluid control circuit having multiple switching capabilities and which is highly reliable in operation, which requires minimum maintenance, which lends itself to inexpensive and simple fabrication.

A further object of the present invention is to provide a fluid switching device having self restoring delay means permitting a staggered switching function without one moving element.

Figure 2:
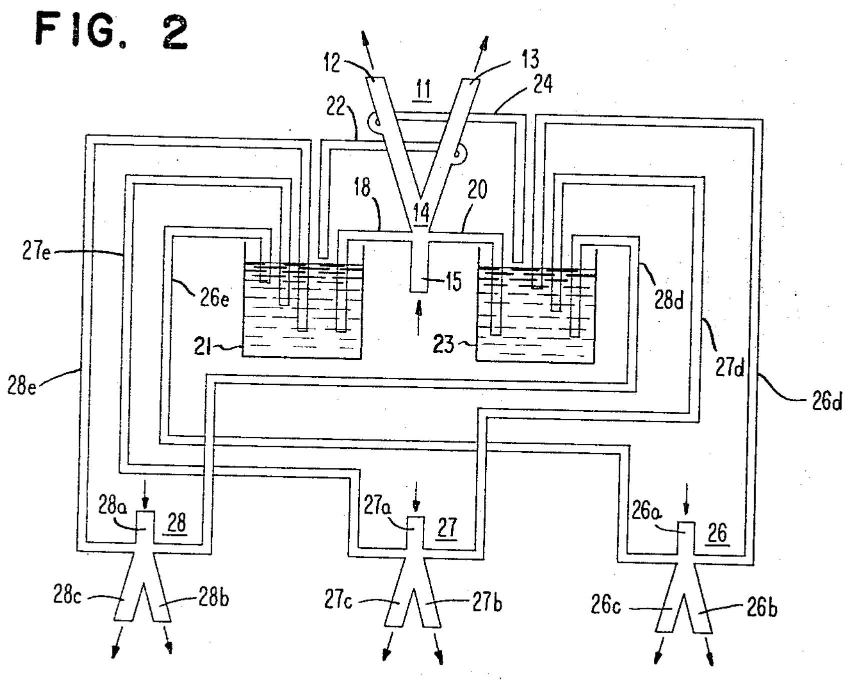

Other objects and many of the attendant advantages of the present invention will become more apparent with the reading of the specification taken in conjunction with the drawings:

Wherein FIGURE 1 illustrates a preferred embodiment of the present invention; and FIGURE 2 illustrates a second embodiment of the present invention.

Referring now more particularly to FIGURE 1 there is shown a fluid amplifier 11 which is of the boundary layer or lock-on type, that is, once the fluid stream is switched to an output channel by application of a control fluid the fluid stream remains in the output channel without the continued application of the control signal. The fluid amplifier 11 may be fabricated in any convenient well known manner, for example, as by molding.

The fluid amplifier 11 comprises output channels 12 and 13 which converge substantially as shown to form interaction chamber 14. A power input channel 15 communicates with the interaction channel 14 via a nozzle 16. Interaction chamber 14 is equally divided by the V-shaped separator 17 disposed between the output channels 12 and 13. A control channel 18 is connected to the interaction chamber 14 via a control nozzle 19 adjacent to and substantially at right angles with the power nozzle 16. Similarly a control channel 20 communicates with the interaction chamber 14 via a control nozzle *20a* adjacent and at right angles to the power nozzle 16 substantially as shown in FIGURE 1.

A tank 21 suitable for holding liquid such as water is disposed to the left of the fluid amplifier 11. One end of the control channel 18 extends into the tank 21 to some predetermined desired depth. One end of a conduit 22 extends into the tank 21 while the other end of the conduit 22 communicates with the output channel 13 through side *13a*.

Another tank 23 identical to the tank 21 is disposed to the right of the fluid amplifier 11. One end of the control channel 20 extends into the tank 23 to the same depth that the control channel 18 extends into the tank 21. One end of a conduit 24 extends into the tank 23 while the other end of the conduit 24 communicates with the output channel 12 through the wall *12a*.

The source of liquid, such as water, is connected to input channel 15 which, depending on initial conditions, causes the power stream of liquid to emerge from the amplifier through output channels 12 or output channel 13. Assuming for purposes of description that the power stream of liquid is sent through the output channel 13, the tank 21 commences to be filled with liquid because conduit 22 bleeds some of the liquid passing through the output channel 13 back into the tank 21. This occurs principally because the liquid in the output channel 13 is under a higher pressure relative to the pressure exerted upon the liquid in the tank 21.

Simultaneous with the filling of the tank 21 liquid is drawn from the tank of 23 through control channel 20 and the nozzle *20a*. This occurs because the power stream passing in close proximity to the opening of the nozzle *20a* creates a suction in the control channel 20 because the power stream creates a partial vacuum between itself and the opening of the nozzle *20a* into the chamber 14. This tendency to a partial vacuum causes the water or liquid within the tank 23 to be drawn through the control channel 20 into the interaction chamber 14 where it joins as part of the power stream output. The vacuum is not wholly satisfied until the depth of the liquid in the tank 23 is below the opening of the control channel 20 in the tank 23. When this occurs ambient air is drawn into the control channel 20 and is converted into a dynamic control stream in the nozzle *20a* of sufficient power to cause the power stream to switch from the output channel 13 to the output channel 12.

Upon this switching the tank 23 which has been substantially emptied of liquid begins to refill through the conduit 24 which bleeds liquid from the output channel 12 into the tank 23 in a manner similar to that of the conduit 22. At the same time liquid from the tank 21 is emptied via the control channel 18 into the interaction chamber 14 where it becomes part of the power stream in the output channel 12. The process of emptying liquid from the tank 21 which had previously been filled continues until the depth of the liquid in tank 21 goes below the opening of a control channel 18 whereupon the control channel 18 draws air which in a manner previously discussed with reference to the control channel 20 causes the power stream to switch from the output channel 12 to the output channel 13. The process is continuous and the power stream oscillates between the output channel 13 and the output channel 12 until the power is removed from the input channel 15.

The device of FIGURE 1 is essentially a fluid oscillator. The period of oscillation is a function of the size of tanks 21 and 23 and the amount of fluid therein. Thus, the period of oscillation may be selected to have desired length by design of the tanks. Furthermore, the period of oscillation is dependent upon the extent to which the control channels 18 and 20 extend into tanks 21 and 23, respectively. Thus if the control channels 18 and 20 extend only a relatively small way into the tanks 21 and 23, the period of oscillation will be small and its frequency high. If the control channels 18 and 20 extend a relatively great distance into the tanks 21 and 23, the period of oscillation will be large and the frequency will have a smaller value.

Furthermore, the various other parameters of the device such as size and length of channels influence the operation thereof. For example, the size of nozzle 16 as well as the pressure at which the fluid is applied to the input channel 15 effects the amount of time necessary to empty one of the tanks as the vacuum created near the openings of nozzles 19 and 20*a* would vary relative to the power of the output power stream. However, it should be understood that selection of the various values of the parameters is a matter of design and would depend on the particular function desired in much the same way as the selection of the various parameters of an electronic circuit are chosen to provide desired operation or range of operation.

FIGURE 2 illustrates an embodiment of the present invention wherein four fluid amplifiers substantially identical in construction to the fluid amplifier discussed in relation to FIGURE 1 are combined in such a way as to provide staggered switching. The embodiment of FIGURE 2 comprises a fluid amplifier 11 identical in every respect with fluid amplifier 11 described in connection with FIGURE 1. Like reference numerals are being used to indicate like elements where possible. It should be noted, however, that none of the amplifiers in FIGURE 2 show the actual nozzles leading from the various control channels and the power input channel. It should be understood that these nozzles would normally be included in an actual device but are here omitted for purposes of expediency in that they are not necessary for an understanding of the operation of the device shown in FIGURE 2.

As in FIGURE 1 the fluid amplifier 11 is provided with the tanks 21 and 23.

The embodiment of FIGURE 2 further includes fluid amplifiers 26, 27 and 28. Fluid amplifier 26 comprises an input channel 26*a* and output channels 26*b* and 26*c*. Fluid amplifier 27 comprises input channel 27*a* and output channels 27*b* and 27*c*. Fluid amplifier 28 comprises input channel 28*a* and output channels 28*b* and 28*c*.

The fluid amplifier 26 has control channels 26*d* and 26*e* which extend to a first predetermined length into the tanks 23 and 21, respectively. The fluid amplifier 27 has control channels 27*d* and 27*e* which extend to a second predetermined length into the tanks 23 and 21, respectively. The fluid amplifier 28 has control channels 28*d* and 28*e* which extend to a third predetermined length into the tanks 23 and 21, respectively. The third predetermined length discussed above is relatively long compared to the first predetermined length. The second predetermined length is intermediate the first and third predetermined lengths. The input channels 15, 26*a*, 27*a* and 28*a* of the fluid amplifiers 11, 26, 27 and 28 are connected to a common source of liquid fluid such as water.

Assuming the power source (not shown) is connected to the input channels 15, 26*a*, 27*a* and 28*a* is so directed that initially there is a power stream output in each of the output channels 13, 26*b*, 27*b* and 28*b*, the tank 23 is begun to be emptied through the control channel 20 while the tank 21 is being filled through the conduit 22. When the end of the control channel 26*d*, which is immersed in the liquid within the tank 23 is uncovered, the control channel 26*d* begins to draw air which switches the power stream from the output channel 26*b* to the output channel 26*c*. A predetermined time later the end of the control channel 27*d* which extends into the tank 23 becomes uncovered resulting in the power stream in the output channel 27*b* being switched into the output channel 27*c*. A further predetermined time later the opening of the control channel 28*d* within the tank 23 is uncovered by the liquid ad the power stream in the output channel 28*b* is switched to the output channel 28*c*.

While the power stream is in the output channels 26*b*, 27*b* and 28*b*, each of the control channels 26*d*, 27*d* and 28*d* contribute to emptying the tank 23 in much the same way as discussed with reference to the fluid amplifier 11 of FIGURE 1. It should be noted, however, that the size of the control channels 26*d*, 27*d* and 28*d* may be chosen to make their contribution to emptying the tank 23 negligible compared to that of the control channel 20. Thus, the fluid amplifier 11 of FIGURE 2 would be the dominating factor in such emptying.

Similarly, when each of the fluid amplifiers 26, 27 and 28 has its power stream switched to the output channels 26*c*, 27*c* and 28*c*, the control channels 26*e*, 27*e* and 28*e* contribute to emptying the tank 21. However, the rate at which these control channels empty the liquid from the tank 21 is negligible compared to that of control channel 18.

Simultaneously with the uncovering the end of the control channel 28*d* within the tank 23, the end of control channel 20 is uncovered, thereby causing the power stream in the output channel 13 to switch to the output channel 12.

With the power stream in the output channel 12 the tank 21 ceases to be filled through conduit 22 and is begun to be emptied through the control channel 18. At the same time, the tank 23 is begun to be filled through the conduit 24. Since the opening of the control channel 26*e* is the first to be uncovered by the liquid in the tank 21, the power stream in the output channel 26*c* is first switched to the output channel 26*b*. Similarly the power streams in the output channels 27*c* and 28*c* are switched to the output channels 27*b* and 28*b*, respectively, when the openings of the control channels 27*e* and 28*e* are sequentially uncovered by the liquid in the tank 21. The opening of the control channel 18 is uncovered by the liquid in the tank 21 and the power stream is switched from the output channel 12 to the output channel 13 whereupon the entire process is repeated.

Although the control channels 26*d*, 27*d*, 28*d*, 26*e*, 27*e* and 28*e* contribute to emptying tanks 23 and 21, respectively, depending on the switched mode of fluid amplifiers 26, 27 and 28, it should be noted that conduits 22 and 24 are so designed with respect to size so as to fill the tanks 21 or 23 at a much more rapid rate than the control channels of fluid amplifiers 26, 27 and 28 can possibly empty them.

One of the outputs of each of the fluid amplifiers 11, 26, 27 and 28 has an output at all times such that some combination of four output channels always provide output power streams as long as the source of fluid is provided.

The tanks 21 and 23 in conjunction with the predetermined lengths of the various control channels disposed therein provide the delays whereby the outputs are sequentially through each of the fluid amplifiers.

The device described in FIGURES 1 and 2 may find use in any liquid fluid circuitry requiring delays, stepping or other regulated flow of the characteristics described.

One specific use, for example, for the fluid control device as described in FIGURES 1 and 2 is as a lawn sprinkler. For such an application the device of the present invention might be formed in one unitary body with the various output channels arranged about a circle and fitted with any desired type of spray nozzle. A garden hose would provide the source of input fluid. The device of FIGURE 2 when used as a lawn sprinkler can be made to cover a relatively wide area and distribute water over that area equally.

It should be noted that the device described with reference to FIGURE 2 is not necessarily limited to the use of four fluid amplifiers but the fluid amplifiers 26, 27 and 28 might be connected in parallel to a plurality of other sets of three of fluid amplifiers. In such a case it would be desirable to do away with conduits 22 and 24 and provide connections to the output of the output channels 12 and 13 to accomplish the function of filling the tanks 21 and 23.

The embodiments of the invention in which an exclusive property or privilege is claimed are defined as follows:

1. A fluid amplifier, comprising in combination: an interaction chamber, first and second output channels leading from said interaction chamber, a first tank, a second tank, a first control channel having one end communicating with one side of said interaction chamber and the other end extending into said first tank, a second control channel having one end communicating with the other side of said interaction chamber and the other end extending into said second tank, means providing said first or second output channel with a liquid power stream, first conduit means connected to said second output channel bleeding liquid into said first tank when said power stream is in said second output channel, second conduit means connected to said first output channel bleeding liquid into said second tank when said power stream is in said first output channel, means creating a vacuum in the area of communication of said first control channel with said interaction chamber when said power stream is in said first output channel causing liquid in said first tank to be drained through said first control channel and a vacuum in the area of communication of said second control with said interaction chamber when said power stream is in said second output channel causing liquid in said second tank to be drained through said second control channel whereby when fluid in said first tank falls below a predetermined level said power stream is switched to said second output channel and when fluid in said second tank falls below a predetermined level said power stream is switched to said first output channel.

2. A fluid control circuit, comprising in combination: a plurality of fluid amplifiers, each of said fluid amplifiers comprising an interaction chamber, first and second output channels leading from said interaction chamber, means providing said first or second output channel with a liquid power stream; a first tank, a second tank, means connected between said interaction chambers of each of said fluid amplifiers and said first tank responsive to different predetermined liquid levels in said first tank to switch said power stream from said first output channel to said second output channel sequentially in each of said fluid amplifier, means connected between said interaction chambers of each of said fluid amplifiers and said second tank responsive to different predetermined liquid levels in said second tank to switch said power stream from said second output channel to said first output channel sequentially in each of said fluid amplifiers.

3. A fluid control circuit, comprising in combination: a plurality of fluid amplifiers, each of said fluid amplifiers comprising an interaciton chamber, first and second output channels leading from said interaction chamber, means providing said first or second output channel with a liquid power stream; a first tank, a second tank, means for selectively filling said first or said second tank with liquid, means for selectively emptying said fluid from said first or second tank simultaneously with the filling of said second or first tank, respectively; means connected between said interaction chambers of each of said fluid amplifiers and said first tank responsive to liquid in said first tank falling below predetermined levels to switch said power stream from said first output channel to said second output channel sequentially in each of said fluid amplifiers, means connected between said interaction chambers of each of said fluid amplifiers and said second tank responsive to liquid in said second tank falling below predetermined levels to switch said power stream from said second output channel to said first output channel sequentially in each of said fluid amplifiers.

4. In a fluid amplifier having a pair of output channels, a pair of control channels and means selectively providing one or the other of said output channels with a liquid power stream, liquid container means, conduit means connecting one of said control channels to said container means, said conduit means depending into said container to a predetermined depth whereby when the liquid in said container means falls below said depth said power stream will be switched between said output channels.

5. In a fluid amplifier having a pair of output channels, a pair of control channels and means selectively providing one or the other of said output channels with a liquid power stream, a pair of liquid containers, a pair of conduit means connecting each of said control channels to a respective liquid container, each of said conduit means depending into its respective container to a predetermined depth whereby when the liquid in either container drops below the depth of the associated conduit means said power stream will be switched between said output channels.

References Cited

UNITED STATES PATENTS

| | | | |
|---|---|---|---|
| 3,117,593 | 1/1964 | Sowers | 137—81.5 X |
| 3,158,166 | 11/1964 | Warren | 137—81.5 |
| 3,159,168 | 12/1964 | Reader | 137—81.5 |
| 3,185,166 | 5/1965 | Horton et al. | 137—81.5 |
| 3,228,410 | 1/1966 | Warren et al. | 137—81.5 |
| 3,267,949 | 8/1966 | Adams | 137—81.5 |

M. CARY NELSON, *Primary Examiner.*

S. SCOTT, *Assistant Examiner.*